United States Patent [19]

Satoh

[11] 4,003,093
[45] Jan. 11, 1977

[54] APPARATUS FOR INDICATING TAPE END IN A TAPE RECORDER AND BATTERY LEVEL

[75] Inventor: Ken Satoh, Tokyo, Japan

[73] Assignee: Olympus Optical Co., Ltd., Tokyo, Japan

[22] Filed: May 27, 1975

[21] Appl. No.: 580,778

[30] Foreign Application Priority Data

June 11, 1974 Japan .................. 49-67868[U]
June 13, 1974 Japan .................. 49-68936[U]

[52] U.S. Cl. .............................. 360/137; 340/249; 340/259; 340/420; 352/170

[51] Int. Cl.² .................. G11B 15/00; G08B 21/00; G08B 19/00; G03B 1/60

[58] Field of Search ................. 360/137, 74, 90–96; 340/249, 259, 420; 324/29.5; 242/191; 136/182; 352/166, 170, 244

[56] References Cited

UNITED STATES PATENTS

| 3,165,037 | 1/1965 | Nevdecker et al. | 324/29.5 |
| 3,562,441 | 2/1971 | Bretschneider | 360/137 |
| 3,660,810 | 5/1972 | Yoshii | 360/137 |
| 3,784,292 | 1/1974 | Winkler et al. | 352/170 |
| 3,838,465 | 9/1974 | Fischer et al. | 360/137 |

OTHER PUBLICATIONS

"Checking the Batteries," Baver C–Royal Instruction Manual, p. 24, 5/71.

Primary Examiner—Robert S. Tupper

[57] ABSTRACT

An apparatus for indicating the end portion of a tape in a tape recorder is approaching includes a voltage comparator which compares the actual voltage of an internally housed battery against a reference voltage of a value which assures a proper operation of the tape recorder. An AND circuit is provided to receive outputs from the voltage comparator and a detector which detects that a tape winding operation has proceeded to an end thereof, and an illuminating or luminescent display is connected with the output of the AND circuit to provide an illumination only when the battery voltage is not less than the reference voltage and the tape is normally running.

7 Claims, 5 Drawing Figures

| | VOLTAGE COMPARATOR OUTPUT | DETECTOR OUTPUT | INDICATOR CURRENT | |
|---|---|---|---|---|
| (i) | + | ⊓⊔⊓⊔ | ⊓⊔⊓⊔ | FLASHING |
| (ii) | + | — | ⌐ | ILLUMINATED |
| (iii) | 0 | ⊓⊔⊓⊔ | — | EXTINGUISHED |
| (iv) | 0 | — | — | EXTINGUISHED |

APPARATUS FOR INDICATING TAPE END IN A TAPE RECORDER AND BATTERY LEVEL

BACKGROUND OF THE INVENTION

The invention relates to an apparatus for indicating the end of a tape in a tape recorder, and more particularly to a tape end display for use in a tape recorder which permits a combined display of the voltage condition of a battery internally housed within the tape recorder and of the end of a tape winding operation.

In a tape recorder which employs an electrical storage battery as a drive source, it is necessary to check and display whether the battery voltage maintains a reference voltage which is required for a normal operation of the tape recorder. If the battery voltage is reduced below the reference voltage, the battery must be replaced for proper operation of the tape recorder since it is, for all practical purposes, exhausted.

It is also desirable to indicate the running of a magnetic tape by some means in order to avoid the failure to record significant information. A tape cassette is usually provided with a transparent window through which a tape running can be recognized. However, a tape recorder in which the tape cassette is loaded is often provided with a cover plate which is placed over the cassette, thereby making it difficult to observe the internal running tape through the viewing window. Therefore, it will be convenient if there is provided some means such as an illuminating display which permits the running of a tape to be easily recognized.

However, providing separate displays for indicating a tape running and a checking of the battery voltage is undesirable in view of both space and cost limitations. In particular, with a miniature tape recorder using a well known micro tape cassette, the space within the body of the recorder is extremely limited, preventing the provision of separate displays. For this reason, a conventional apparatus is only provided with an illumination display of the battery voltage, and no display is made of the tape running and the tape end. Therefore, it will be useful to provide a combined display for the both purposes.

SUMMARY OF THE INVENTION

It is a first object of the invention to provide an apparatus for indicating tape end in a tape recorder which utilizes an AND circuit to energize a single illuminating display only when the battery voltage maintains a reference voltage and when the tape is normally running, thereby enabling both the detection of the battery voltage and the end of a tape winding operation to be displayed by means of a single unit.

It is a second object of the invention to provide an apparatus for indicating tape end in a tape recorder which employs a combination of an exclusive OR circuit and an AND circuit to energize a single illuminating display in distinct manners such that the display can be continuously illuminated, flashed or extinguished, thereby enabling both the detection of the battery voltage and the tape end to be by only one display element displayed.

In accordance with the invention, the single AND circuit is utilized in a sophisticated manner so as to energize the single illuminating display only when the battery voltage maintains the reference voltage and when the tape is normally running. In addition, an exclusive OR circuit can be combined with the AND circuit so as to energize the illuminating display in three distinct manners, thereby enabling a separate display of the battery voltage and the tape end to be advantageously achieved. Since the single display is used for both purposes, no additional space is required for the provision of the apparatus according to the invention, which therefore can be very economical. The visual display is advantageous in ease of recognition and distinction afforded by the display.

DETAILED DESCRIPTION OF PREFERRED EMBODIMENTS OF THE INVENTION

Figure 1:
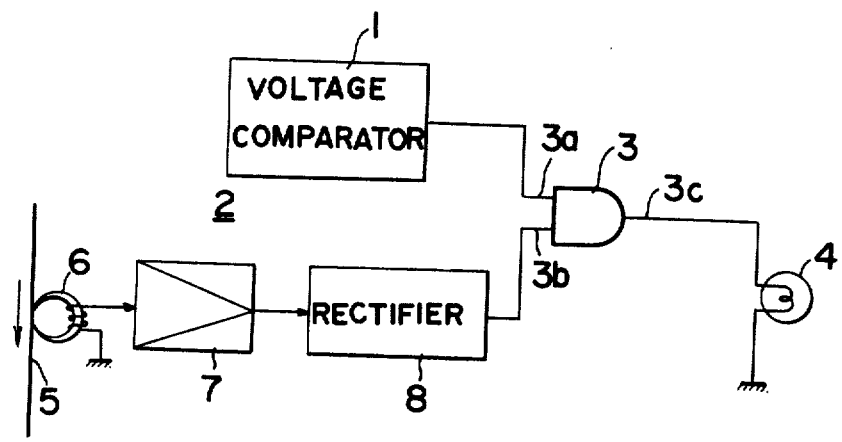
FIG. 1 is a schematic block diagram of an embodiment of the apparatus according to the invention.
Figure 2:
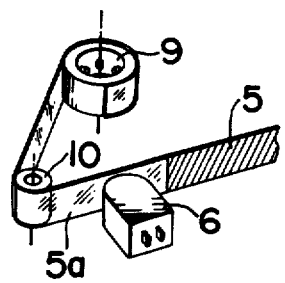
FIG. 2 is a perspective view of one example of a tape end detector.

Referring to FIG. 1, the apparatus shown includes a voltage comparator 1, a tape end detector 2, AND circuit 3, and a single illuminating display 4 which is energized by an output from the circuit 3. The voltage comparator 1 may comprise an electrical circuit such as well known Schmidt circuit, which produces a fixed output voltage for application to one input terminal 3a of the AND circuit 3 when the voltage of a battery or drive source contained within a tape recorder is equal to or above a reference voltage which is required for the normal operation of the tape recorder. When the battery voltage is reduced below the reference voltage, the battery must be replaced by a fresh one. In accordance with the invention, the reference voltage represents a threshold value against which the output voltage from the battery is compared. When the output voltage from the battery is reduced below the reference voltage, the comparator 1 produces no output. The tape end detector 2 comprises a recorded signal sensing head 6, an amplifier 7 for amplifying an output signal from the head 6, and a rectifier 8 for rectifying an output signal from the amplifier 7. The sensing head 6 serves to detect a signal which is magnetically recorded on a running tape 5, and a sensed signal is amplified by the amplifier 7 and rectified by the rectifier 8 before being applied to the other input terminal 3b of the AND circuit 3. As illustrated in FIG. 2 which shows a terminal end of a cassette tape, the opposite terminal ends of the tape which are secured to tape hubs 9 (only one being shown) are not applied with a magnetizable material, forming a non-record zone 5a which only comprises a transparent film such as a polyester film which constitutes the base of the tape. Thus, when the tape 5 which extends around a guide roller 10 is reeled off the tape hub 9 to its terminal end and the non-record zone 5a bears against the sensing head 6, the latter produces no output, whereby an input to the terminal 3b of the AND circuit 3 is removed.

The AND circuit 3 produces an output signal at its output terminal 3c only when it receives the output signals from the comparator 1 and the detector 2 at both of its input terminals 3a, 3b. An illuminating display 4 is connected with the output terminal 3c so as to be energized in accordance with the output signal of the AND circuit 3. The display 4 may comprise any illuminating or luminescent element such as a lamp, luminescent diode or the like.

In operation, when the output voltage of the battery is equal to or above the reference voltage and the tape is normally running, the comparator 1 and the detector 2 each apply their outputs to the input terminals 3a, 3b of the AND circuit 3, which therefore produces an output signal at its terminal 3c for energizing the display 4. Thus, the display is illuminated, indicating a normal running of the tape and the level of the battery voltage which is not less than the reference voltage. When a tape end is reached under such normal condition, the detector 2 no longer produces an output signal, whereby an output from the AND circuit 3 is removed, extingusihing the display 4. In the event the battery voltage has reduced below the reference voltage in the course of the normal running of a tape, the comparator 1 no longer produces an output signal, so that an output is also removed from the AND circuit 3, causing the display 4 to be extinguished again. In this manner, the extinction of the display indicates either that a tape end is reached or that the battery voltage has reduced below the reference voltage, or both.

Figure 3:
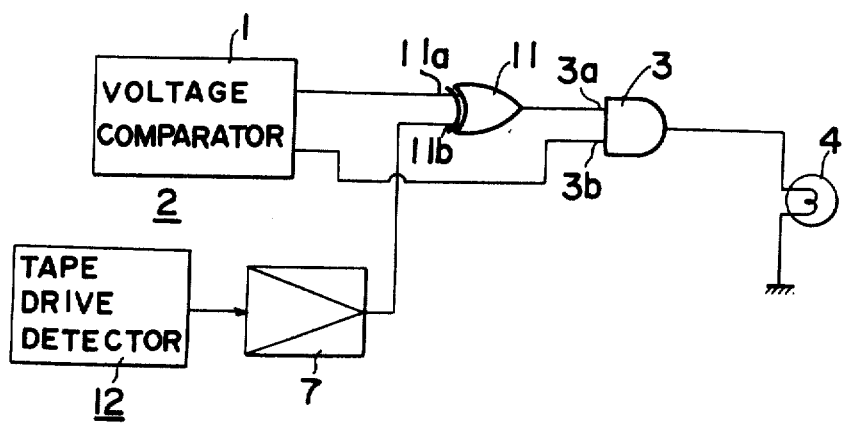
FIG. 3 is a block diagram of another embodiment of the apparatus according to the invention.

FIG. 3 shows another embodiment of the invention which incorporates an exclusive OR circuit 11 in combination with the circuit shown in FIG. 1 so that the single illuminating display 4 can be operated in distinctive manners, i.e., continuous illumination, flashing and extinction. Again, the voltage comparator 1 produces a fixed output voltage when the battery voltage is equal to or above the reference voltage, and this output voltage is applied to one input terminal 11a of the exclusive OR circuit 11 and to the input terminal 3b of the AND circuit 3. In the present arrangement, the output of the comparator 1 is reduced to zero (0) when the battery voltage is reduced below the reference voltage.

Figures 4, 5:
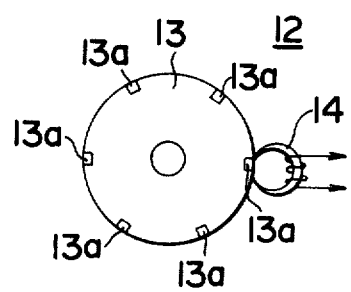
FIG. 4 is a plan view of a specific example of a tape drive detector used in the embodiment of FIG. 3.
FIG. 5 is a series of graphs illustrating various outputs and waveforms appearing in the circuit shown in FIG. 3.

The tape end detector 2 may comprise any conventional pulse generator, but in the arrangement shown in FIG. 3, it comprises a tape drive detector 12 and the FIG. 4. As indicated in FIG. 4, the tape drive detector 12 comprises a rotating body 13 which rotates with a take-up or supply reel, a plurality of permanent magnets 13a mounted at an equal spacing along the periphery of the body 13, and a magnetic sensing head 14 which is disposed adjacent to the periphery of the body 13. As the body 13 rotates together with the reel, the head 14 responds to the magnetic flux from the magnets 13a to produce pulses in a sequential manner. The tape end detector 2 produces an intermittent positive output as the tape runs. This output is amplified by the amplifier 7 and then applied to the other input terminal 11b of the exclusive OR circuit 11. In response to the intermittent signal and the positive output signal from the comparator 1, the exclusive OR circuit 11 produces no output during that time the both signals are applied thereto, but produces an output when the pulse signal from the detector 12 returns to its low level. Thus the output of the exclusive OR circuit 11 is in the form of pulses which are phase displaced by the pulse width of the pulse signals applied by the detector 12, which pulses are applied to the input terminal 3a of the AND circuit 3. In response to the intermittent positive output signal from the exclusive OR circuit 11 and the positive output signal from the voltage comparator 1, the AND circuit 3 produces an intermittent positive output signal which is applied to a single illuminating display 4 which is connected with the output terminal thereof. The display 4 may comprise an illuminating or luminescent element such as a lamp or luminescent diode as in the previous embodiment.

In operation, during the operation of the tape recorder, when the battery voltage maintains the reference voltage and the tape is normally running, the respective positive output signals from the comparator 1 and the detector 2 are applied to the exclusive OR circuit 11, and the intermittent positive output signal from the exclusive OR circuit 11 and the positive output signal from the comparator 1 are applied to the AND circuit 3. As a consequence, the display 4 is energized with a current waveform such as shown in FIG. 5 (i) to be flashed thereby. The flashing display indicates to an operator that both the battery voltage and the tape running are normal.

When a tape end is reached under this condition, the tape running is interrupted, (i.e. halted) so that the output signal from the detector 2 is removed or returned to zero, whereby the intermittent positive output signal which had been applied to the exclusive OR circuit 11 is eliminated. However, the AND circuit 3 receives both the positive output signal from the exclusive OR circuit 11 and the positive output signal from the comparator 1. As a result, the display 4 is energized with a constant current as indicated in FIG. 5 (ii), hence is continuously illuminating. This indicates to an operator that the tape running has reached a tape end. Then the tape can be replaced.

It is to be noted that an arrangement is made such that any of the magnets 13a on the body 13 is out of alignment with the head 14 when the tape is at rest.

If the battery voltage is reduced below the reference voltage in the course of the normal running of the tape, the output voltage from the comparator 1 is reduced to zero. As a result, no energizing current flows through the display 4, which is extinguished, as indicated in FIG. 5 (iii). This indicates to an operator that the battery is exhausted.

In the event the battery is exhausted and the tape end is reached, all of the output signals applied to the various circuits are removed as indicated in FIG. 5 (iv), completely extinguishing the display 4. This indicated to an operator that the operation of the tape recorder is not normal. In the manner mentioned above, the present embodiment employs a sophisticated combination of exclusive OR and AND circuits to operate the single illuminating display in three distinctive manners, namely, continuous illumination, flashing and extinction, thereby enabling both the battery voltage and the tape end to be separately detected.

What is claimed is:

1. A tape recorder having an apparatus for indicating when one end of a tape in the tape recorder has almost completely unwound from a tape reel in the tape recorder and for indicating the level of a battery provided in the tape recorder comprising voltage comparator means for comparing the voltage of the battery internally housed within the tape recorder against a reference level which is required for the normal operation of the tape recorder and to produce an output signal when the battery voltage is reduced below the reference voltage; said tape having a non-record zone at each end thereof;

tape end detector means positioned adjacent to the tape and being responsive to the movement of the tape for normally producing an output signal during the running of the tape, the output signal of the detector means being absent when a non-record zone at one terminal end of the tape passes said detector means; and AND circuit coupled to the voltage comparator means and the detector means for receiving an output signal from the detector means and from the voltage comparator means, and display means connected with the output of the AND circuit to be illuminated only when the battery voltage is at least equal to the reference level and when the tape is running and has not completely unwound from the reel whereby the signals from said comparator means and detector means are simultaneously applied to the AND circuit under such conditions.

2. The recorder of claim 1 in which said tape end detector means comprises sensing head means positioned adjacent to the tape for sensing a magnetically recorded signal on the tape; amplifier means for amplifying the output of said sensing means; and rectifier means for rectifying the output of said amplifier means, whereby the sensing head means, upon detecting the passage of the non-record zone at a terminal end of the magnetic tape, causes the output of the rectifier means to be altered sufficiently to cause the AND circuit to turn off said display means.

3. An apparatus according to claim 1 in which the display means comprises a single luminescent diode.

4. A tape recorder having an apparatus for indicating when one end of a tape in the tape recorder has almost completely unwound itself from a tape reel in the tape recorder and for detecting the level of the battery in the tape recorder, comprising voltage comparator means for comparing the voltage of the battery internally housed within the tape recorder against a reference level which is required for the normal operation of the tape recorder and to produce an output signal when the battery voltage is reduced below the reference level; tape end detector means for producing an intermittent output signal during the running of the tape; an exclusive OR circuit coupled to said comparator means and said detector means for respectively receiving output signals therefrom; and AND circuit coupled to said exclusive OR circuit and to said voltage comparator means for respectively receiving output signals therefrom; illuminating display means connected to the output of the AND circuit; said tape end detector means being responsive to the running of the tape for generating an intermittent signal whereby the display means is flashed only during the running of the tape and when the battery voltage is at least equal to said reference level, said display means being continuously illuminated when the battery voltage is at least equal to said reference level and when said tape winding operation has arrived at one end of the tape, and said display means being extinguished whenever the battery voltage is below said reference level.

5. An apparatus according to claim 4 in which the tape end detector means comprises means responsive to rotation of said reel to produce pulses only during the running of the tape.

6. An apparatus according to claim 4 in which the tape end detector means comprises a rotating body which rotates responsive to rotation of the tape reel, a plurality of permanent magnets mounted at equal spaced intervals around the periphery of the rotating body, and a magnetic sensing head means disposed adjacent to the periphery of the body for sensing changes in magnetic flux developed by the moving magnets, thereby sensing movement of the tape.

7. An apparatus according to claim 4 in which the display means comprises a single luminescent diode.

* * * * *